(12) United States Patent
Ye et al.

(10) Patent No.: US 11,239,471 B2
(45) Date of Patent: Feb. 1, 2022

(54) CATHODE ELECTRODE DESIGN FOR ELECTROCHEMICAL FUEL CELLS

(71) Applicant: Ballard Power Systems Inc., Burnaby (CA)

(72) Inventors: Siyu Ye, Burnaby (CA); Alexander Man-Chung Leung, Vancouver (CA); Kyoung Bai, Vancouver (CA); Dustin William H. Banham, West Vancouver (CA); Alan Young, Surrey (CA)

(73) Assignee: BALLARD POWER SYSTEMS INC., Burnaby (CA)

( * ) Notice: Subject to any disclaimer, the term of this patent is extended or adjusted under 35 U.S.C. 154(b) by 235 days.

(21) Appl. No.: 16/336,462

(22) PCT Filed: Sep. 29, 2017

(86) PCT No.: PCT/US2017/054596
§ 371 (c)(1),
(2) Date: Mar. 25, 2019

(87) PCT Pub. No.: WO2018/064623
PCT Pub. Date: Apr. 5, 2018

(65) Prior Publication Data
US 2020/0036012 A1    Jan. 30, 2020

Related U.S. Application Data

(60) Provisional application No. 62/402,638, filed on Sep. 30, 2016.

(51) Int. Cl.
*H01M 4/86* (2006.01)
*H01M 8/1004* (2016.01)
(Continued)

(52) U.S. Cl.
CPC ......... *H01M 4/8657* (2013.01); *C08F 214/26* (2013.01); *H01M 4/8652* (2013.01);
(Continued)

(58) Field of Classification Search
None
See application file for complete search history.

(56) References Cited

U.S. PATENT DOCUMENTS

| 6,117,581 A | 9/2000 | Shelef |
| 2006/0083971 A1 | 4/2006 | DeSimone et al. |

(Continued)

FOREIGN PATENT DOCUMENTS

| CN | 102986067 A | 3/2013 |
| JP | 3-502982 A | 7/1991 |

(Continued)

OTHER PUBLICATIONS

JPH10284087 English translation. Wakizoe et al. Japan. Oct. 23, 1998. (Year: 1998).*

(Continued)

*Primary Examiner* — Christopher P Domone
(74) *Attorney, Agent, or Firm* — Seed Intellectual Property Law Group LLP

(57) ABSTRACT

A membrane electrode assembly including: an anode electrode; a cathode electrode; and a polymer electrolyte membrane; wherein the cathode includes a first cathode catalyst sublayer including a first precious metal catalyst composition and a first ionomer composition including a first ionomer and a second ionomer; and a second cathode catalyst sublayer including a second precious metal catalyst composition and a second ionomer composition including a third ionomer; wherein the first ionomer is different from the second ionomer in at least one of chemical structure and equivalent weight.

14 Claims, 4 Drawing Sheets

(51) Int. Cl.
  *H01M 4/88* (2006.01)
  *H01M 4/90* (2006.01)
  *C08F 214/26* (2006.01)

(52) U.S. Cl.
  CPC ....... *H01M 4/8668* (2013.01); *H01M 4/8807* (2013.01); *H01M 4/9075* (2013.01); *H01M 8/1004* (2013.01); *H01M 2004/8689* (2013.01)

(56) References Cited

U.S. PATENT DOCUMENTS

| | | | |
|---|---|---|---|
| 2007/0269698 A1 | 11/2007 | Gu | |
| 2011/0143254 A1 | 6/2011 | Kongkanand et al. | |
| 2012/0009503 A1* | 1/2012 | Haug | H01M 4/8828 429/523 |
| 2012/0189942 A1 | 7/2012 | Moose et al. | |
| 2014/0242368 A1 | 8/2014 | Mokrini | |
| 2016/0156054 A1* | 6/2016 | Chuy | H01M 4/861 429/465 |
| 2017/0141406 A1 | 5/2017 | Young et al. | |

FOREIGN PATENT DOCUMENTS

| | | |
|---|---|---|
| JP | 10-284087 A | 10/1998 |
| JP | 2001-338654 A | 12/2001 |
| JP | 2008-176990 A | 7/2008 |
| JP | 2011-124223 A | 6/2011 |
| JP | 2012-513659 A | 6/2012 |
| JP | 2013-254714 A | 12/2013 |
| JP | 2017-525103 A | 8/2017 |
| KR | 1020070106303 A | 11/2007 |
| WO | 2016/007671 | 1/2016 |
| WO | 2016/007671 A1 | 1/2016 |
| WO | 2018/064576 A1 | 4/2018 |

OTHER PUBLICATIONS

International Search Report for PCT Application No. PCT/US2017/054501 dated Jan. 12, 2017.

Written Opinion for PCT Application No. PCT/US2017/054501 dated Jan. 12, 2017.

* cited by examiner

CATHODE ELECTRODE DESIGN FOR ELECTROCHEMICAL FUEL CELLS

BACKGROUND

Field of the Disclosure

The present disclosure relates to catalyst layers for electrochemical fuel cells, in particular, cathode catalyst layers of membrane electrode assemblies for electrochemical fuel cells.

Description of the Related Art

Electrochemical fuel cells convert fuel and oxidant into electricity. Solid polymer electrochemical fuel cells generally employ a membrane electrode assembly that includes a solid polymer electrolyte membrane disposed between two electrodes. The membrane electrode assembly is typically interposed between two electrically conductive flow field plates to form a fuel cell. These flow field plates act as current collectors, provide support for the electrodes, and provide passages for the reactants and products. Such flow field plates typically include fluid flow channels to direct the flow of the fuel and oxidant reactant fluids to an anode and a cathode of each of the membrane electrode assemblies, respectively, and to remove excess reactant fluids and reaction products. In operation, the electrodes are electrically coupled for conducting electrons between the electrodes through an external circuit. Typically, a number of fuel cells are electrically coupled in series to form a fuel cell stack having a desired power output.

The anode and the cathode each contain a layer of anode catalyst and cathode catalyst, respectively. The catalyst may be a metal, an alloy or a supported metal/alloy catalyst, for example, platinum supported on carbon black. The catalyst layer may contain an ion conductive material, such as NAFION® (provided by E. I. du Pont de Nemours and Co.) and/or a binder, such as polytetrafluoroethylene (PTFE). Each electrode further includes an electrically conductive porous substrate, such as carbon fiber paper or carbon cloth, for reactant distribution and/or mechanical support. The thickness of the porous substrate typically ranges from about 50 to about 250 microns. Optionally, the electrodes may include a porous sublayer disposed between the catalyst layer and the substrate. The sublayer usually contains electrically conductive particles, such as carbon particles, and, optionally, a water repellent material for modifying its properties, such as gas diffusion and water management. The catalyst may be coated onto the membrane to form a catalyst-coated membrane (CCM) or coated onto the sublayer or the substrate to form an electrode.

The catalyst is one of the most expensive components in a fuel cell due to the precious metals that are typically used. Such precious metals include platinum and gold, which are often mixed with or alloyed with other metals, such as ruthenium, iridium, cobalt, nickel, molybdenum, palladium, iron, tin, titanium, manganese, cerium, chromium, copper, and tungsten, to enhance preferred reactions and mitigate unwanted side reactions, which are different for the anode and the cathode. The catalyst may be supported on a catalyst support to reduce the loading of the catalyst required as well as to improve electronic conductivity in the catalyst layer. Additional electron conductors, such as carbons and graphites, may be used in the catalyst layer to further improve electrical conductivity.

The anode and cathode half-cell reactions in hydrogen gas fuel cells are shown in the following equations:

$$H_2 \rightarrow 2H^+ + 2e^- \quad (1)$$

$$\tfrac{1}{2}O_2 + 2H^+ + 2e^- \rightarrow H_2O \quad (2)$$

On the anode, the primary function is to oxidize hydrogen fuel to form protons and electrons. Depending on the fuel source, the anode catalyst may need to be tolerant to impurities. For example, carbon monoxide poisoning of the anode catalyst often occurs when operating on a reformate-based fuel. To mitigate carbon monoxide poisoning, a platinum alloy catalyst, such as platinum-ruthenium, is preferable on the anode.

On the cathode, the primary function is to reduce oxygen and form water. This reaction is inherently much slower than the anode reaction and, thus, the cathode catalyst loading is typically higher than the anode catalyst loading. One way of enhancing the cathode half-cell reaction is to improve electrochemical activity and catalyst utilization of the catalyst layer, thereby reducing voltage losses related to electronic and protonic resistance as well as mass transport. In another example, as disclosed in U.S. Patent Publication No. 2017/0141406, a bilayer cathode catalyst layer design may provide improvement in both performance and durability.

In the catalyst layer, it is well-known in the art that a three-phase boundary where catalyst, reactants and electrolyte (or membrane) meet is necessary to carry out electrochemical reactions. For example, in order to carry out the oxygen reduction reaction on the cathode of a conventional polymer electrolyte fuel cell, protons need to be conducted from the membrane to the catalyst though a proton conductor, electrons need to be conducted to the current collector from the catalyst, and oxygen and product water needs to be able to travel to and from the catalyst layer and the gas channels.

The proton conductor used in the catalyst layer is typically an ionomer that may be the same or different from the ionomer in the membrane. Many different ionomers exist in the art in various compositions and equivalent weights (EW). Typically, a lower EW ionomer is preferable at low relative humidity and a higher EW ionomer is preferable at high relative humidity.

Numerous studies have been done to characterize the ionomer in membranes. The most commonly used ionomer is the perfluorosulfonic acid (PFSA) ionomer, such as Nafion® (DuPont), particularly for low to medium temperature applications because of its relatively high resistance to chemical degradation as well as its relatively high proton conductivity under wet operating conditions. However, its proton conduction dependence on hydration levels makes Nafion® not suitable for operation at low relative humidity or drier conditions, or relatively high temperatures (over 100 degrees Celsius).

In some applications, particularly automotive, performance needs to be maintained under a wide range of operating conditions, whether at high and low temperatures and/or relative humidities. Ionomers with different properties and chemical structure each present their own advantages at different operation conditions. As a result, there still exists much research in catalyst layer designs to improve performance over a wide range of operating parameters. The present description addresses these issues and provides further related advantages.

BRIEF SUMMARY

Briefly, the present disclosure relates to cathode catalyst layers for electrochemical fuel cells.

In one embodiment, a membrane electrode assembly comprises an anode electrode comprising an anode gas diffusion layer and an anode catalyst layer; a cathode electrode comprising a cathode gas diffusion layer and a cathode catalyst layer; and a polymer electrolyte membrane interposed between the anode catalyst layer and the cathode catalyst layer; wherein the cathode catalyst layer comprises: a first cathode catalyst sublayer adjacent the polymer electrolyte membrane, the first cathode catalyst sublayer comprising a first precious metal catalyst composition and a first ionomer composition comprising a first ionomer and a second ionomer; and a second cathode catalyst sublayer adjacent the cathode gas diffusion layer, the second cathode catalyst sublayer comprising a second precious metal catalyst composition and a second ionomer composition comprising a third ionomer; wherein the first ionomer is different from the second ionomer in at least one of chemical structure and equivalent weight.

In some embodiments, the first ionomer has the chemical structure of (1) and the second ionomer has the chemical structure of (2):

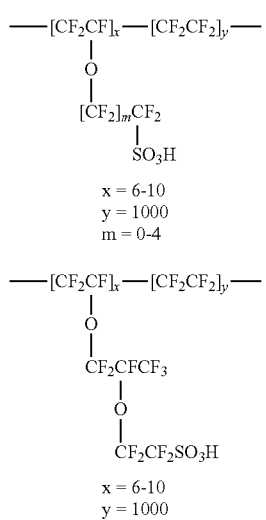

In some embodiments, the first ionomer has a lower equivalent weight than the second ionomer.

In some embodiments, the first ionomer is different from the second ionomer in chemical structure and equivalent weight.

In specific embodiments, the first ionomer has an equivalent weight of less than about 900 EW and the second ionomer has an equivalent weight of equal to or greater than about 900 EW.

These and other aspects will be evident upon reference to the attached drawings and following detailed description.

BRIEF DESCRIPTION OF THE FIGURES

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve figure legibility. Further, the particular shapes of the elements, as drawn, are not intended to convey any information regarding the actual shape of the particular elements, and have been solely selected for ease of recognition in the figures.

DETAILED DESCRIPTION

Unless the context requires otherwise, throughout the specification and claims which follow, the word "comprise" and variations thereof, such as "comprises" and "comprising" are to be construed in an open, inclusive sense, that is as "including but not limited to".

In the present context, "loading" refers to the amount of material that is formed or applied to a substrate, and is usually expressed as the mass of material per unit surface area of the substrate.

In the present context, "surface area" of the catalyst and catalyst support refers to the surface area as measured by the BET method.

As used herein, "graphitized carbon" refers to carbon materials that comprise mainly graphitic carbon at least on the surface of a carbon particle.

In the present context, carbonaceous supports that are "at least partially graphitized" means that the surface of the carbonaceous support comprises at least some graphitic carbon.

Figure 1:
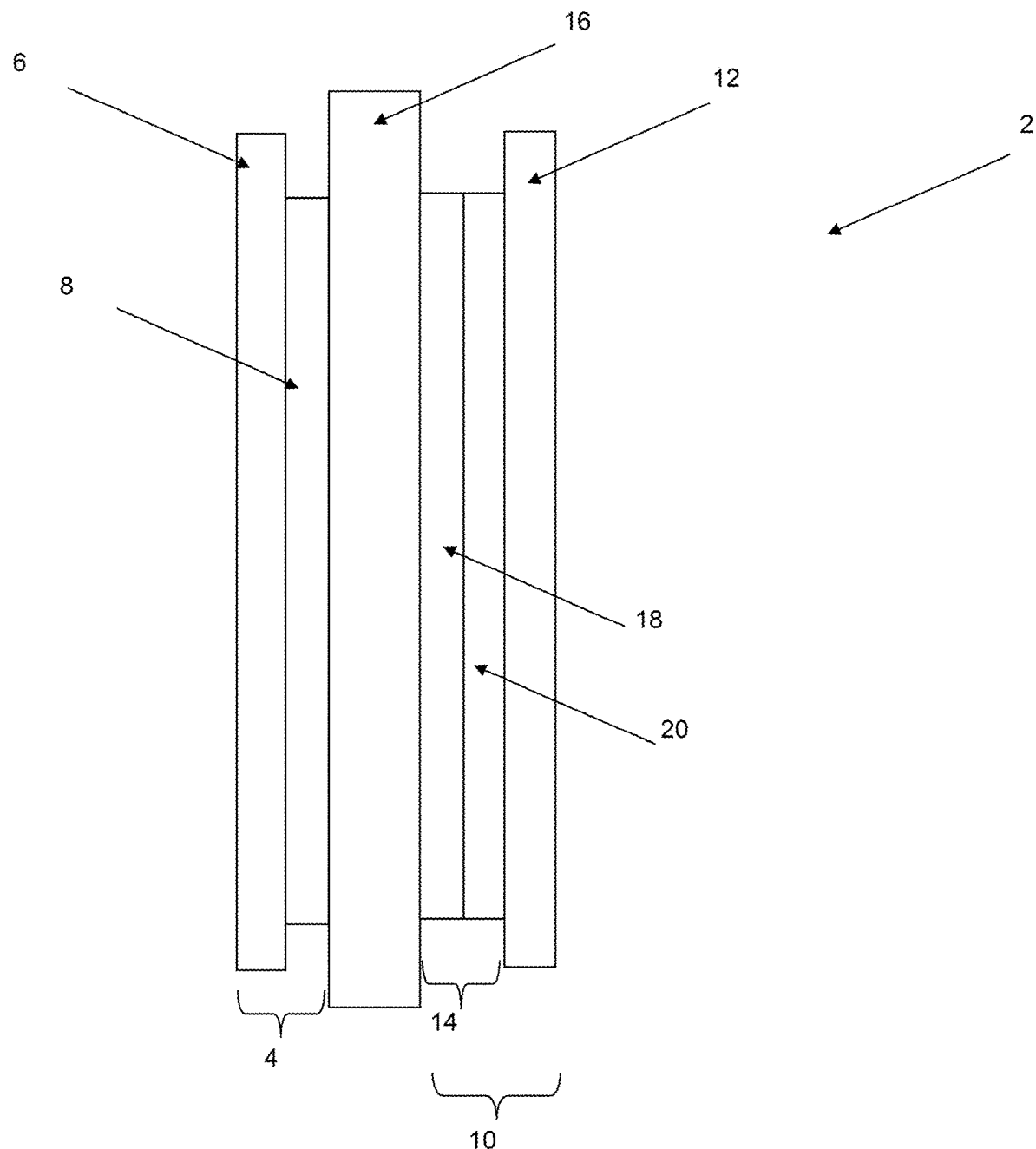
FIG. 1 shows an exploded cross-section of a membrane electrode assembly according to one embodiment.

According to one embodiment, with reference to FIG. 1, membrane electrode assembly 2 comprises an anode electrode 4 comprising an anode gas diffusion layer 6 and an anode catalyst layer 8; a cathode electrode 10 comprising a cathode gas diffusion layer 12 and a cathode catalyst layer 14; and a polymer electrolyte membrane 16 interposed between anode catalyst layer 8 and cathode catalyst layer 14. Cathode catalyst layer 14 has a first cathode catalyst sublayer 18 adjacent membrane 16 and a second cathode catalyst sublayer 20 adjacent the cathode gas diffusion layer 12. First cathode catalyst sublayer 18 has a first precious metal catalyst composition and a first ionomer composition comprising a first ionomer and a second ionomer, and second cathode catalyst sublayer 20 has a second precious metal catalyst composition and a second ionomer composition comprising a third ionomer. The first ionomer is different from the second ionomer in at least one of chemical structure and equivalent weight.

In one embodiment, the first ionomer comprises shorter side chains than the second ionomer. In specific embodiments, the first ionomer comprises the chemical structure of (1) and the second ionomer comprises the chemical structure of (2):

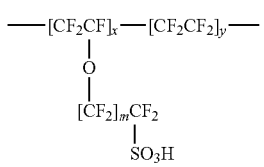

(1)

$x = 6\text{-}10$
$y = 1000$
$m = 0\text{-}4$

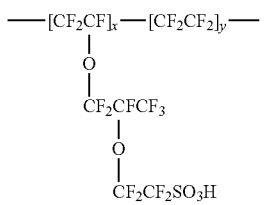

(2)

$x = 6\text{-}10$
$y = 1000$

In another embodiment, the first ionomer has a lower equivalent weight than the second ionomer. For example, the first ionomer may have an equivalent weight of equal to or less than about 900 EW (typically considered "low EW" by one skilled in the art) while the second ionomer may have an equivalent weight of greater than about 900 EW (typically considered "high EW" by one skilled in the art). In other examples, the equivalent weight of the first ionomer is lower than the equivalent weight of the second ionomer by at least about 100, for example, by at least about 150. In specific embodiments, the first ionomer may have an equivalent of about 850 and the second ionomer may have an equivalent weight of about 1100.

In further embodiments, the first ionomer is different from the second ionomer in both equivalent weight and chemical structure. For example, the first ionomer has a lower equivalent weight than the second ionomer and the first ionomer has shorter side chains than the second ionomer. In specific embodiments, the first ionomer has the chemical structure of (1) while the second ionomer has the chemical structure of (2).

As discussed in the foregoing, different chemical structure ionomers and different equivalent weight ionomers have their own advantages and short-comings.

It was surprisingly discovered that by employing a mix of two ionomers that are different in chemical structure and equivalent weight in the cathode catalyst sublayer adjacent the membrane in a bilayer cathode catalyst layer design, there was improvement in performance at both 60% and 100% relative humidity (RH) as opposed to single ionomers in the first and second cathode catalyst sublayers of a bilayer cathode catalyst layer design. In particular, the first cathode catalyst sublayer may contain about 30 wt % to about 80 wt % of the first ionomer (balance second ionomer).

Exemplary ionomers in the catalyst sublayers include, but are not limited to, those that are sold under the Nafion® (DuPont), Dyneon™ (3M), Aciplex® (Asahi Kasei Corporation, Japan), Flemion® (Asahi Glass Co., Japan), and Aquivion® (Solvay Plastics, Japan) tradenames, as well as other PFSA ionomers provided by Asahi Glass (Japan). It is well-known in the art that Nafion® ionomer, as well as Flemion® and Aciplex® ionomers, have relatively longer side chains, and Aquivion® and Dyneon® ionomers have relatively shorter side chains.

The catalysts in the catalyst layers are precious metals such as, but not limited to, platinum, gold, ruthenium, iridium, and palladium, and alloys, solid solutions, and intermetallic compounds thereof. The precious metal may also be alloyed or form an intermetallic compound with a metal such as, but not limited to, cobalt, nickel, molybdenum, iron, tin, titanium, manganese, cerium, chromium, copper or tungsten. The first and second precious metal compositions may comprise of one or more catalysts. For example, the first precious metal catalyst composition may comprise an alloy of platinum and cobalt supported on a high surface area carbon black support mixed with platinum supported on a graphitic support. In addition, the catalyst in the first precious metal catalyst composition may be the same or different from the catalyst in the second precious metal catalyst composition.

The catalysts in the first and second precious metal catalyst compositions may be optionally supported on a catalyst support. The catalyst support may be a carbonaceous support, such as activated carbon, carbon black, carbon that is at least partially graphitized, and graphite. As a person skilled in the art will appreciate, the graphitization level of the carbon support can be measured via a number of techniques, such as high resolution TEM spectroscopy, Raman spectroscopy, and XPS (x-ray photoemission spectra). In some embodiments, the catalysts in the first and second precious metal catalyst compositions may have the same or different coverage on their respective catalyst supports.

In specific embodiments, the first precious metal catalyst composition comprises a platinum-cobalt alloy supported on a high surface area carbon black support, such as ketjen black or acetylene carbon black, while the second precious metal catalyst composition comprises platinum supported on a graphitized carbon support. In another specific embodiment, the first precious metal catalyst composition comprises a platinum-nickel alloy supported on carbon, such as those used for shape-controlled catalysts.

The precious metal loading of the anode and cathode electrode should be low to minimize cost. For example, the platinum loading of the anode electrode may range from about 0.01 mg Pt/cm$^2$ to about 0.15 mg Pt/cm$^2$ while the platinum loading of the cathode electrode may range from about 0.04 mg Pt/cm$^2$ to about 0.6 mg Pt/cm$^2$. The anode and cathode catalyst layers and sublayers may contain additional carbon and/or graphite particles to assist with catalyst layer application, and for water management purposes. The anode and cathode catalyst layers and sublayers may also contain a binder such as hydrophobic binder (e.g., PTFE), ionomer, and combinations thereof. The cathode catalyst sublayers may each contain the same amount of ionomer or may contain different amounts of ionomer. The ionomer content may range from, for example, 10 wt % to 50 wt %.

The anode gas diffusion layer and cathode gas diffusion layer should be electrically conductive, thermally conductive, adequately stiff for mechanical support of the catalyst layer and membrane, sufficiently porous to allow for gas diffusion, and thin and lightweight for high power density. Thus, conventional gas diffusion layer materials are typically chosen from commercially available woven and non-woven porous carbonaceous substrates, including carbon fiber paper and carbon fabrics, such as carbonized or graphitized carbon fiber non-woven mats. Suitable porous substrates include, but are not limited to, TGP-H-060 and TGP-H-090 (Toray Industries Inc., Tokyo, Japan); P50 and EP-40 (AvCarb Material Solutions, Lowell, Mass.); and GDL 24 and 25 series material (SGL Carbon Corp., Charlotte, N.C.). In some embodiments, the porous substrate may be hydrophobicized, and may optionally include at least one gas diffusion sublayer having carbon and/or graphite in fibrous and/or particulate form.

The polymer electrolyte membrane may be any suitable proton-conducting material or ionomer, such as, but not limited to, Nafion® (DuPont), Flemion® (Asahi Glass, Japan), Aquivion® (Solvay Plastics), GORE-SELECT® (W.L. Gore & Associates), and Aciplex® (Asahi Kasei, Japan), as well as membranes from 3M.

The MEA and catalyst layers and sublayers can be made via methods known in the art. For example, the catalyst ink may be directly applied to the gas diffusion layer or membrane by screen-printing, knife-coating, spraying or gravure coating, or decal-transferred to the gas diffusion layer or membrane. The catalyst ink may be applied in a single application or in multiple thin coatings to achieve the desired catalyst loading and/or catalyst layer structure.

While only carbon and graphitized carbon supports have been discussed, it is contemplated that other carbon supports, such as carbon nanotubes and carbon nanofibers, and non-carbon supports, such as oxide supports, may also be substituted for the supports described herein. In addition, while only the cathode electrode design has been discussed and shown, it is contemplated that the anode electrode may also benefit from a two-sublayer catalyst layer design.

EXAMPLES

Ten types of MEAs were made with different cathode catalysts and ionomers in the cathode catalyst layers and sublayers. The MEA configurations are summarized in Table 1.

TABLE 1

MEA Configurations

| MEA name | Anode Catalyst | Cathode Catalyst - Sublayer #1 | Cathode Catalyst - Sublayer #2 |
|---|---|---|---|
| Comparative Example 1 | 0.1 mg Pt/cm$^2$, platinum supported on carbon black, 23 wt % Nafion ® ionomer | 0.4 mg Pt/cm$^2$ of Pt supported on graphitized carbon black, 23 wt % 1100 EW Nafion ® ionomer | None |
| Comparative Example 2 | 0.1 mg Pt/cm$^2$, platinum supported on carbon black, 23 wt % Nafion ® ionomer | 0.4 Pt/cm$^2$ of Pt supported on graphitized carbon black, 16 wt % 825 EW Aquivion ® ionomer | None |
| Comparative Example 3 | 0.1 mg Pt/cm$^2$, platinum supported on carbon black, 23 wt % Nafion ® ionomer | 0.4 Pt/cm$^2$ of Pt supported on graphitized carbon black, 23 wt % 825 EW Aquivion ® ionomer | None |
| Comparative Example 4 | 0.1 mg Pt/cm$^2$, platinum supported on carbon black, 23 wt % Nafion ® ionomer | 0.4 Pt/cm$^2$ of Pt supported on graphitized carbon black, 30 wt % 825 EW Aquivion ® ionomer | None |
| Comparative Example 5 | 0.1 mg Pt/cm$^2$, platinum supported on carbon black, 23 wt % Nafion ® ionomer | 0.15 mg Pt/cm$^2$ of Pt—Co alloy supported on carbon black, 40 wt % 1100 EW Nafion ® ionomer | 0.1 mg Pt/cm$^2$, platinum supported on carbon black, 30 wt % 1100 EW Nafion ® ionomer |
| Comparative Example 6 | 0.1 mg Pt/cm$^2$, platinum supported on carbon black, 23 wt % Nafion ® ionomer | 0.15 mg Pt/cm$^2$, platinum supported on carbon black, 30 wt % 1100 EW Nafion ® ionomer | 0.1 mg Pt/cm$^2$ of Pt—Co alloy supported on carbon black, 12 wt % 825 EW Aquivion ® ionomer, 24 wt % 1100 EW Nafion ® ionomer |
| Comparative Example 7 | 0.1 mg Pt/cm$^2$, platinum supported on carbon black, 23 wt % Nafion ® ionomer | 0.1 mg Pt/cm$^2$, platinum supported on carbon black, 30 wt % 1100 EW Nafion ® ionomer | 0.15 mg Pt/cm$^2$ of Pt—Co alloy supported on carbon black, 12 wt % 825 EW Aquivion ® ionomer, 24 wt % 1100 EW Nafion ® ionomer |
| Present Example 1 | 0.1 mg Pt/cm$^2$, platinum supported on carbon black, 23 wt % Nafion ® ionomer | 0.15 mg Pt/cm$^2$ of Pt—Co alloy supported on carbon black, 18 wt % 825 EW Aquivion ® ionomer, 18 wt % 1100 EW Nafion ® ionomer | 0.1 mg Pt/cm$^2$, platinum supported on carbon black, 30 wt % 1100 EW Nafion ® ionomer |

TABLE 1-continued

MEA Configurations

| MEA name | Anode Catalyst | Cathode Catalyst - Sublayer #1 | Cathode Catalyst - Sublayer #2 |
|---|---|---|---|
| Present Example 2 | 0.1 mg Pt/cm$^2$, platinum supported on carbon black, 23 wt % Nafion ® ionomer | 0.15 mg Pt/cm$^2$ of Pt—Co alloy supported on carbon black, 12 wt % 825 EW Aquivion ® ionomer, 24 wt % 1100 EW Nafion ® ionomer | 0.1 mg Pt/cm$^2$, platinum supported on carbon black, 30 wt % 1100 EW Nafion ® ionomer |
| Present Example 3 | 0.1 mg Pt/cm$^2$, platinum supported on carbon black, 23 wt % Nafion ® ionomer | 0.15 mg Pt/cm$^2$ of Pt—Co alloy supported on carbon black, 9 wt % 825 EW Aquivion ® ionomer, 27 wt % 1100 EW Nafion ® ionomer | 0.1 mg Pt/cm$^2$, platinum supported on carbon black, 30 wt % 1100 EW Nafion ® ionomer |

For all of the MEAs, the cathode catalyst inks were coated onto a membrane (Gore® membrane for Comparative Examples 1 to 4 and Nafion® membrane for Comparative Examples 5 to 7, as well as Present Examples 1 to 3) to form a half-CCM, with cathode catalyst sublayer #1 adjacent the membrane and cathode catalyst sublayer #2 adjacent cathode catalyst sublayer #1 and the cathode gas diffusion layer, such as that shown in FIG. 1. Each of the half-CCMs then had a supported platinum anode catalyst layer decal transferred to the membrane side of the half-CCM to form a complete CCM. The complete CCM was then sandwiched between two hydrophobized carbon fibre GDLs from AvCarb Material Solutions such that the GDLs were adjacent the catalyst layers and subsequently sealed to form an unbonded MEA. (If the cathode catalyst layer contained two sublayers, then the GDL was placed against the second cathode catalyst sublayer.)

The MEAs were placed between flow field plates to form fuel cells or fuel cell stacks with 45 cm$^2$ of active area. Comparative Examples 1 to 4 were conditioned overnight and then subjected to the test conditions in Table 2.

TABLE 2

Test Conditions

| Fuel | 100% Hydrogen |
| Oxidant | Air (21% oxygen) |
| Relative humidity | 100% and 60% |
| Temperature | 75° C. |
| Pressure | 5 PSIG |

Figure 2A:
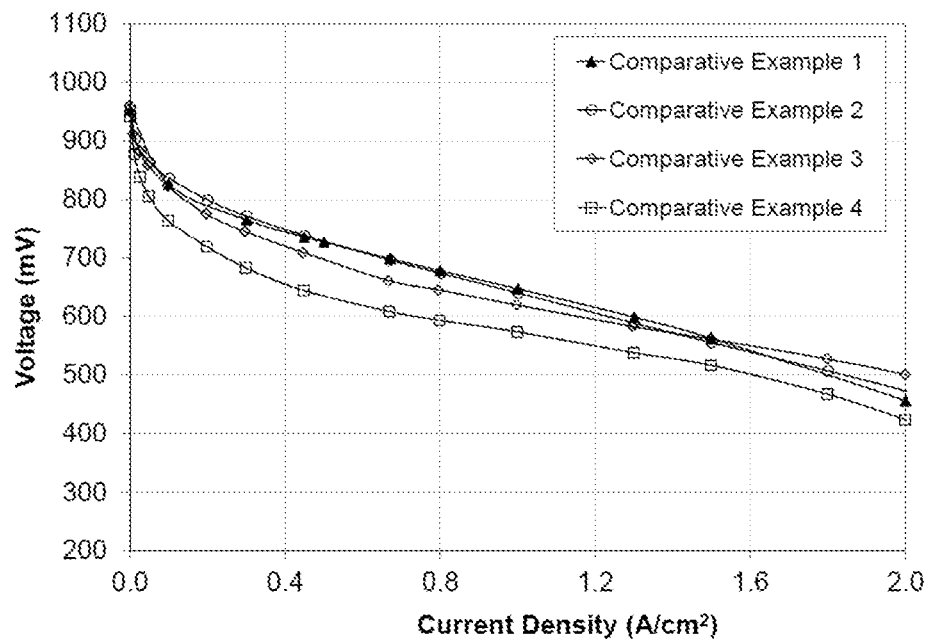
FIG. 2a shows a graph of the steady-state polarization curves for Comparative Examples 1 through 4 at 100% relative humidity.
Figure 2B:
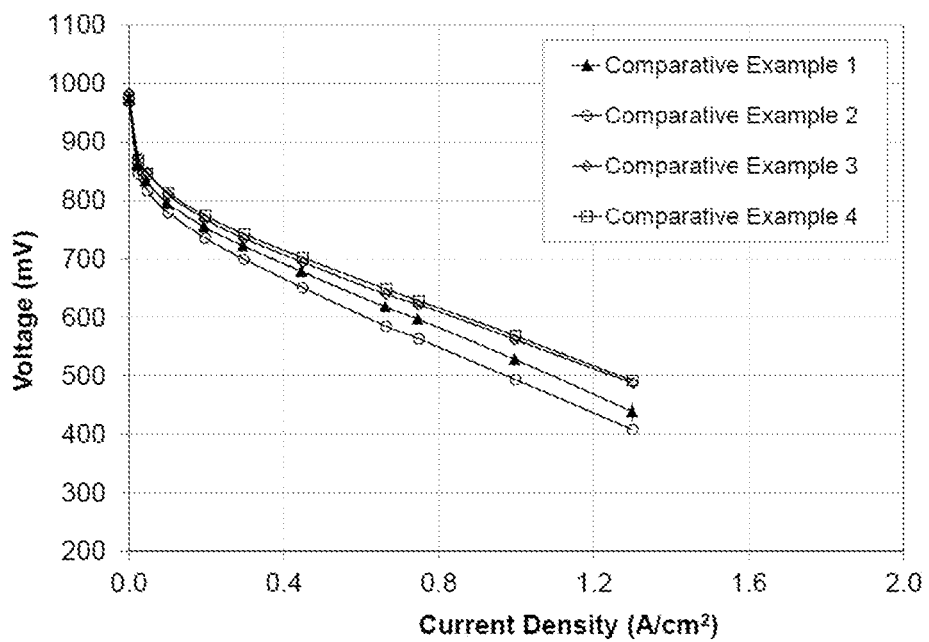
FIG. 2b shows a graph of the steady-state polarization curves for Comparative Examples 1 through 4 at 60% relative humidity.

FIG. 2a shows the steady-state polarization curves for Comparative Examples 1 to 4. It is evident that comparable performance was achieved with Comparative Example 2 with lower Aquivion® content (16 wt %) when compared to Comparative Example 1 with Nafion® (23 wt %) but performance was successively poorer with increasing weight % of the low EW short-side chain ionomer at 100% RH (relative humidity). However, at 60% RH as shown in FIG. 2b, Comparative Examples 3 and 4 with the middle and highest Aquivion® contents (23 wt % and 30 wt %, respectively) showed substantially better performance at high current density than Comparative Example 1 and 2. Therefore, different ionomers are preferable at different operating RH.

To determine the effect of blended ionomers in different layers of a bilayer cathode catalyst layer design, Comparative Examples 5 to 7, as well as Present Examples 1 to 3 were conditioned overnight at 100% RH and then subjected to the test conditions of Table 3.

TABLE 3

Test Conditions

| Fuel | 100% Hydrogen |
| Oxidant | Air (21% oxygen) |
| Relative humidity | 100% and 60% |
| Temperature | 75° C. |
| Pressure | 21.6 PSIG |

Figure 3A:
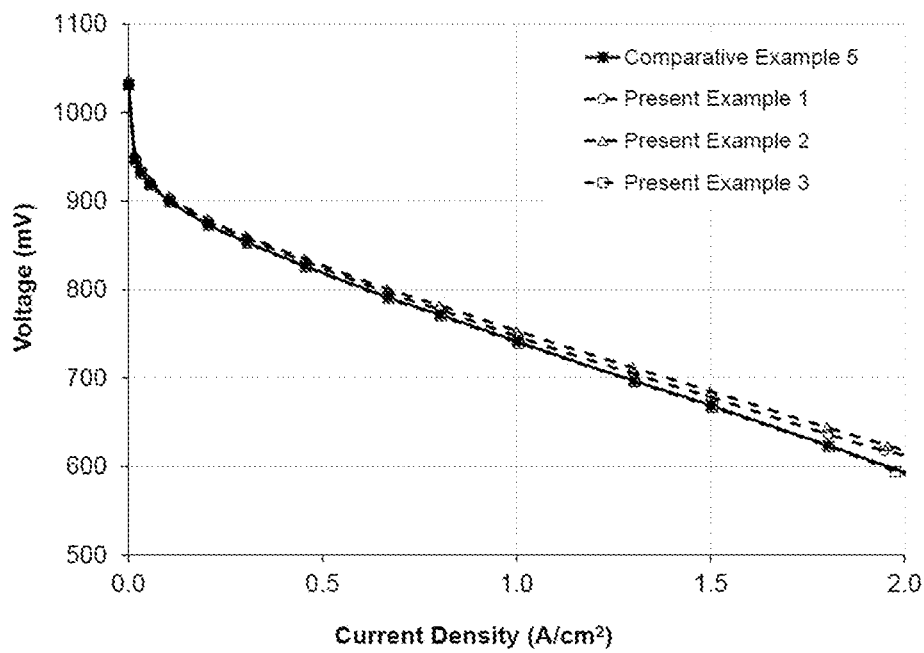
FIG. 3a shows a graph of the average steady-state polarization curves for Comparative Example 5 and Present Examples 1 through 3 at 100% relative humidity.
Figure 3B:
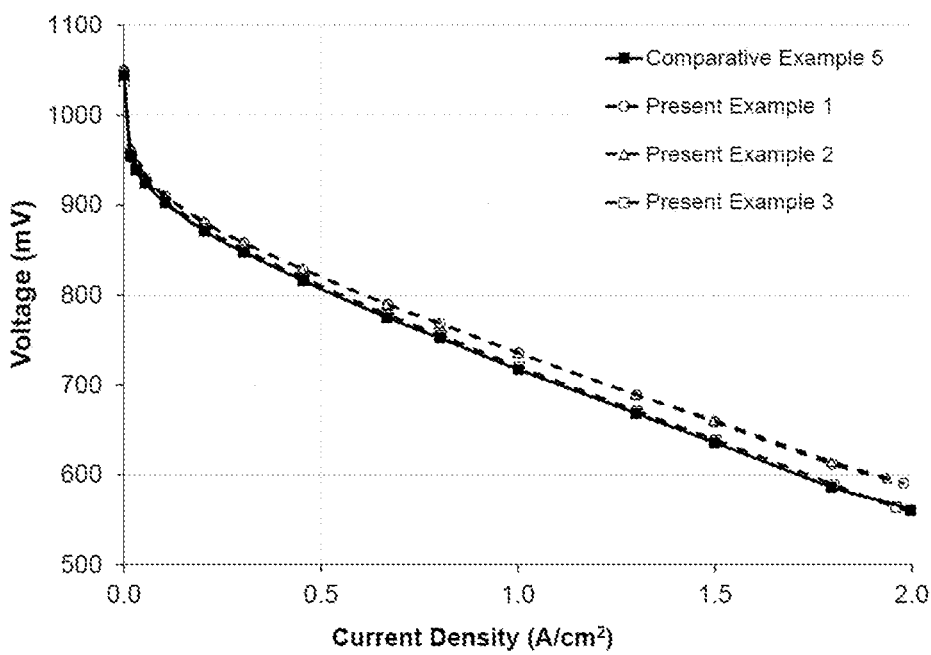
FIG. 3b shows a graph of the average steady-state polarization curves for Comparative Example 5 and Present Examples 1 through 3 at 60% relative humidity.

FIG. 3a shows the average steady-state polarization curves for ten MEAs with the cathode of Comparative Example 5 compared with the average steady-state polarization curves for MEAs with Present Example 1, 2, and 3 (seven MEAs with the cathode of Present Example 1, seven MEAs with the cathode of Present Example 2, and nine MEAs with the cathode of Present Example 3) at 100% RH while FIG. 3b shows the average steady-state polarization curves for the same MEAs at 60% RH. It is evident that all of the MEAs with the mixed ionomer in cathode catalyst sublayer #1 showed at least similar, if not better, performance than the MEAs with a single catalyst layer with a mixed ionomer (Comparative Example 5) at both 60% and 100% RH. Furthermore, Present Example 2 showed the best performance at both 60% and 100% RH. Therefore, a bilayer cathode catalyst layer design with a mixed ionomer in one of the cathode catalyst sublayers is preferable over a single cathode catalyst layer with a mixed ionomer.

Figure 4A:
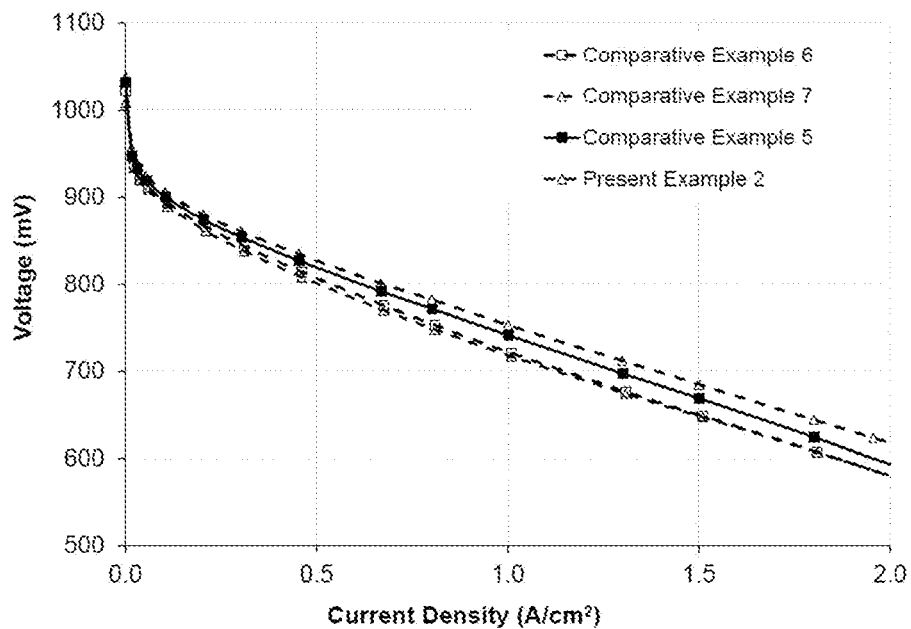
FIG. 4a shows a graph of the steady-state polarization curves for Comparative Examples 5 through 7 and Present Example 2 at 100% relative humidity.
Figure 4B:
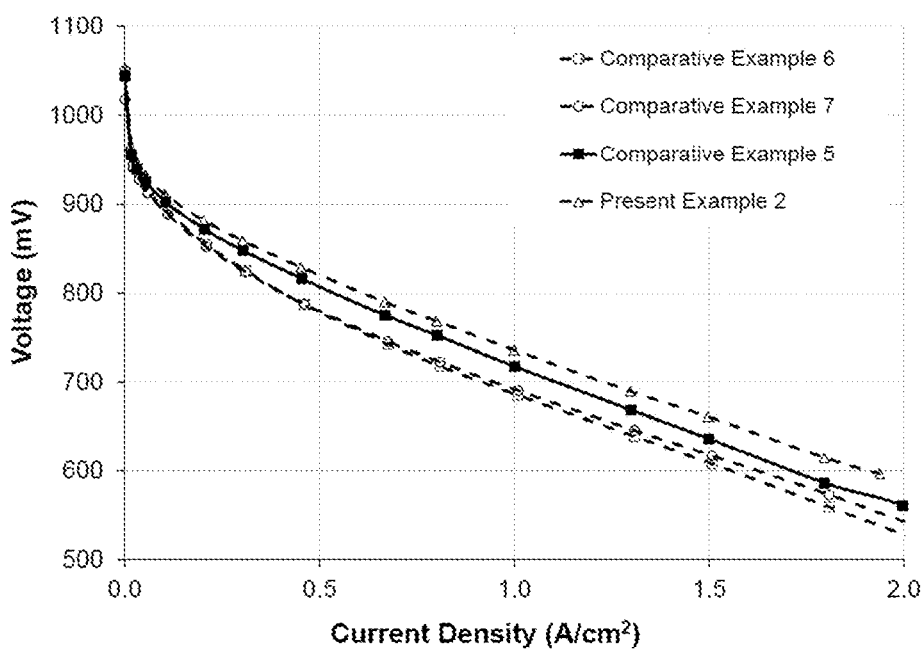
FIG. 4b shows a graph of the steady-state polarization curves for Comparative Examples 5 through 7 and Present Example 2 at 60% relative humidity.

For further comparison, Comparative Examples 6 and 7 with a single ionomer in cathode catalyst sublayer #1 (i.e., in the catalyst sublayer adjacent the membrane) and a mixed ionomer in cathode catalyst sublayer #2 (i.e., in the catalyst sublayer adjacent the GDL) with different platinum loadings were tested. FIGS. 4a and 4b show the steady-state polarization curves of Comparative Examples 6 and 7 (single cell tests), in comparison with Comparative Example 5 and Present Example 2 at 100% RH and 60% RH, respectively. It is evident that Present Example 2 with the mixed ionomer in cathode catalyst sublayer #1 showed better performance than Comparative Examples 6 and 7 with the mixed ionomer in cathode catalyst sublayer #2 at both 100% RH and 60% RH. Therefore, a mixed ionomer is preferable in the first cathode catalyst sublayer (adjacent the membrane) rather than in the second cathode catalyst sublayer (adjacent the gas diffusion layer) in a bilayer cathode catalyst layer design.

While the examples show that the first cathode catalyst sublayer includes a first ionomer that is different in both equivalent weight and chemical structure than the second ionomer, it is contemplated that similar benefits in performance will be experienced with a mixed ionomer in which they have the same chemical structure but different equivalent weight or different chemical structure but the same equivalent weight because the ionomers will have different water management capability (including their water uptake/dimensional stability) as well as proton conduction. Their mixture may thus bring similar benefits as the mixture of ionomers that differ in both EW and chemical structures, as shown in the examples.

This application also claims the benefit of U.S. Provisional Patent Application No. 62/402,638, filed Sep. 30, 2016, and is incorporated herein by reference in its entirety. All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

While particular elements, embodiments, and applications have been shown and described, it will be understood that the disclosure is not limited thereto since modifications may be made by those skilled in the art without departing from the spirit and scope of the present disclosure, particularly in light of the foregoing teachings.

What is claimed is:

1. A membrane electrode assembly comprising:
    an anode electrode comprising an anode gas diffusion layer and an anode catalyst layer;
    a cathode electrode comprising a cathode gas diffusion layer and a cathode catalyst layer; and
    a polymer electrolyte membrane interposed between the anode catalyst layer and the cathode catalyst layer;
    wherein the cathode catalyst layer comprises:
        a first cathode catalyst sublayer adjacent the polymer electrolyte membrane, the first cathode catalyst sublayer comprising a first precious metal catalyst composition and a first ionomer composition comprising a first ionomer and a second ionomer; and
        a second cathode catalyst sublayer adjacent the cathode gas diffusion layer, the second cathode catalyst sublayer comprising a second precious metal catalyst composition and a single, second ionomer composition comprising a single, third ionomer;
    wherein the first ionomer is different from the second ionomer in at least one of chemical structure and equivalent weight.

2. The membrane electrode assembly of claim 1, wherein the first ionomer has the following chemical structure:

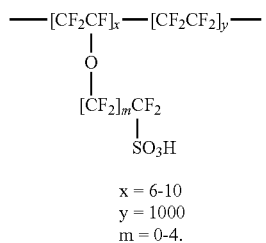

x = 6-10
y = 1000
m = 0-4.

3. The membrane electrode assembly of claim 2, wherein the second ionomer has the following chemical structure:

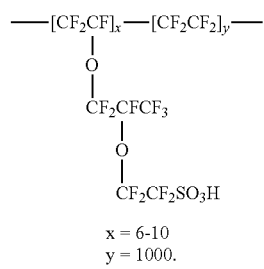

x = 6-10
y = 1000.

4. The membrane electrode assembly of claim 1, wherein the first ionomer has a lower equivalent weight than the second ionomer.

5. The membrane electrode assembly of claim 1, wherein the equivalent weight of the first ionomer is lower than the equivalent weight of the second ionomer by over about 100.

6. The membrane electrode assembly of claim 1, wherein the first ionomer has an equivalent of less than about 900 EW and the second ionomer has an equivalent weight of equal to or greater than about 900 EW.

7. The membrane electrode assembly of claim 1, wherein the first ionomer is different from the second ionomer in both chemical structure and equivalent weight.

8. The membrane electrode assembly of claim 1, wherein the first and second precious metal catalyst compositions are different.

9. The membrane electrode assembly of claim 1, wherein at least one of the first and second ionomers are perfluorinated.

10. The membrane electrode assembly of claim 1, wherein the first cathode catalyst sublayer comprises about 30 wt % to about 80 wt % of the first ionomer composition.

11. The membrane electrode assembly of claim 1, wherein at least one of the first and second precious metal catalyst compositions comprises at least one precious metal catalyst selected from the group consisting of platinum, gold, ruthenium, iridium, and palladium, and alloys, solid solutions, and intermetallic compounds thereof.

12. The membrane electrode assembly of claim 11, wherein the at least one precious metal catalyst is supported on a catalyst support.

13. The membrane electrode assembly of claim 11, wherein the first precious catalyst composition comprises a first catalyst and second catalyst, wherein the first catalyst and second catalyst are different.

14. A fuel cell comprising the membrane electrode assembly of claim 1.

* * * * *